Dec. 20, 1932.  H. G. WEYMOUTH  1,891,461
PISTON TYPE METER
Filed Dec. 21, 1929  6 Sheets-Sheet 1
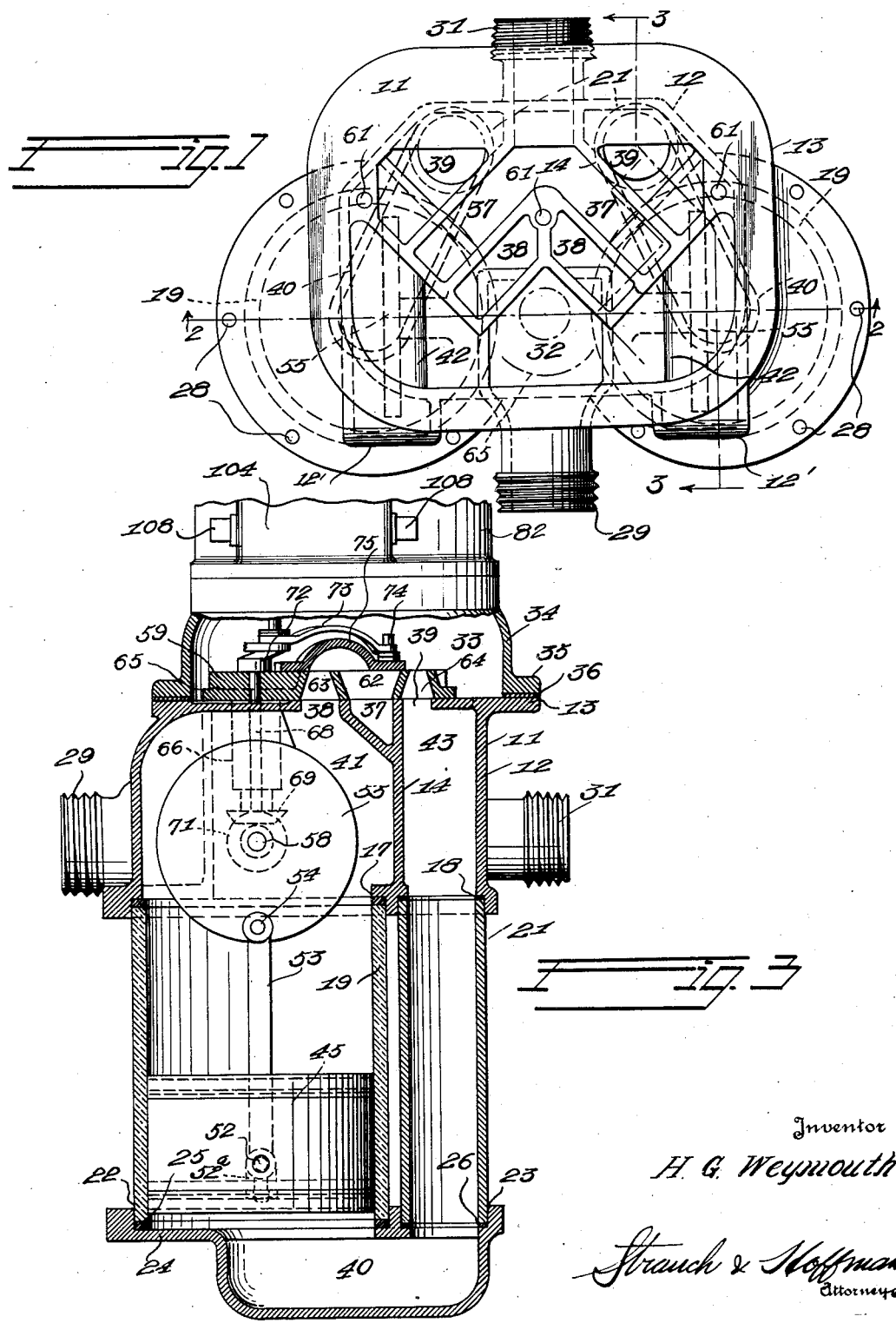
Inventor
H. G. Weymouth
Strauch & Hoffman
Attorneys

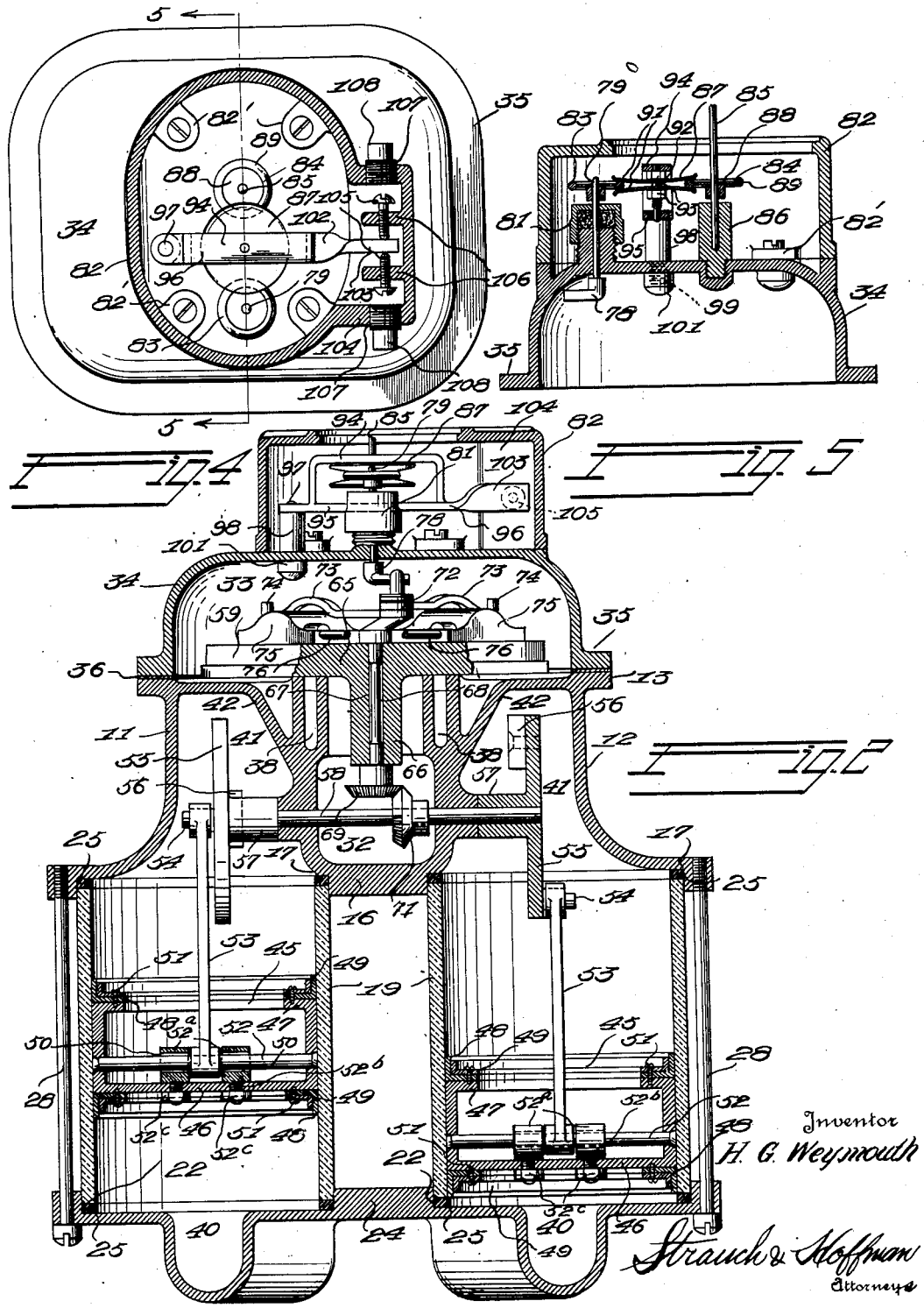

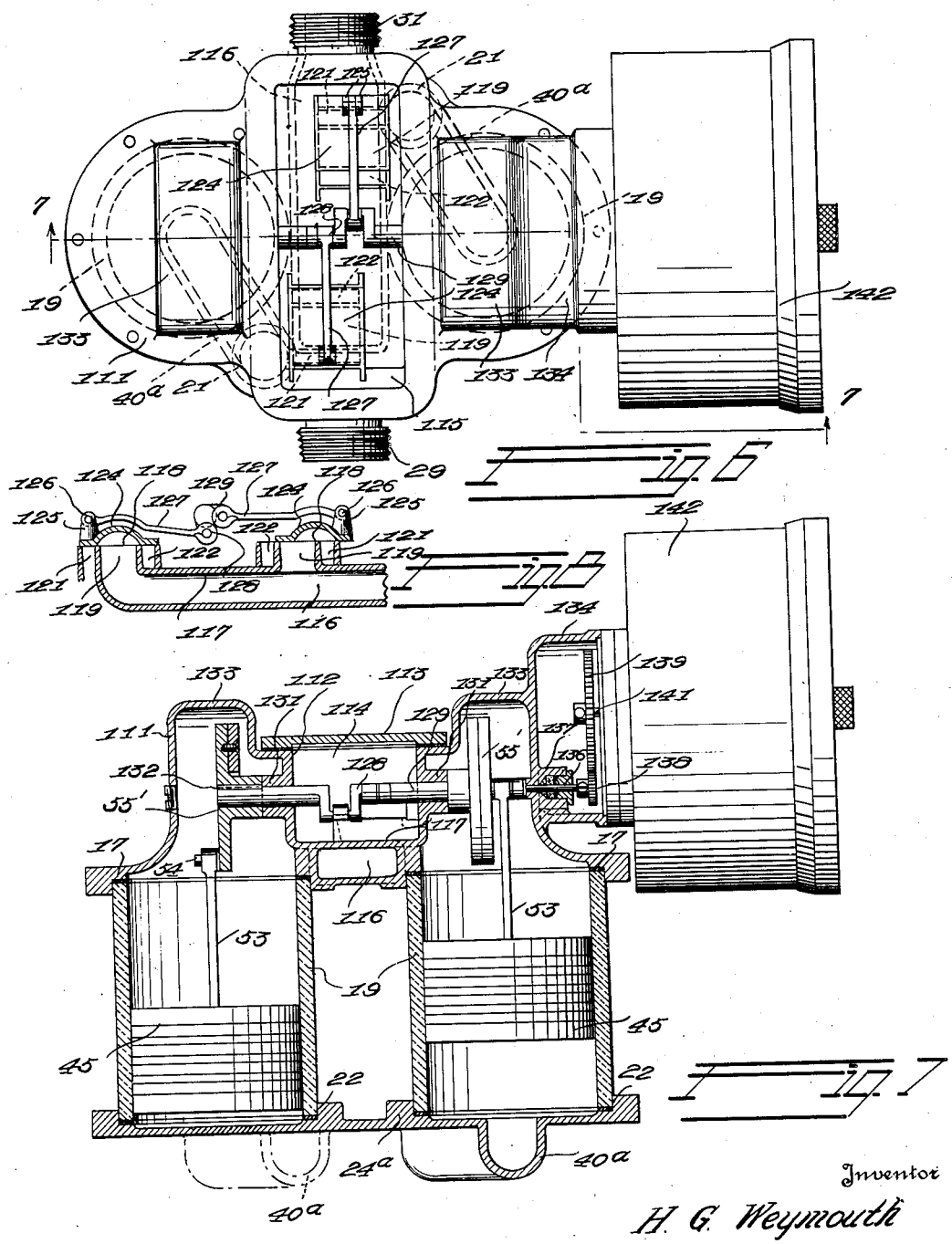

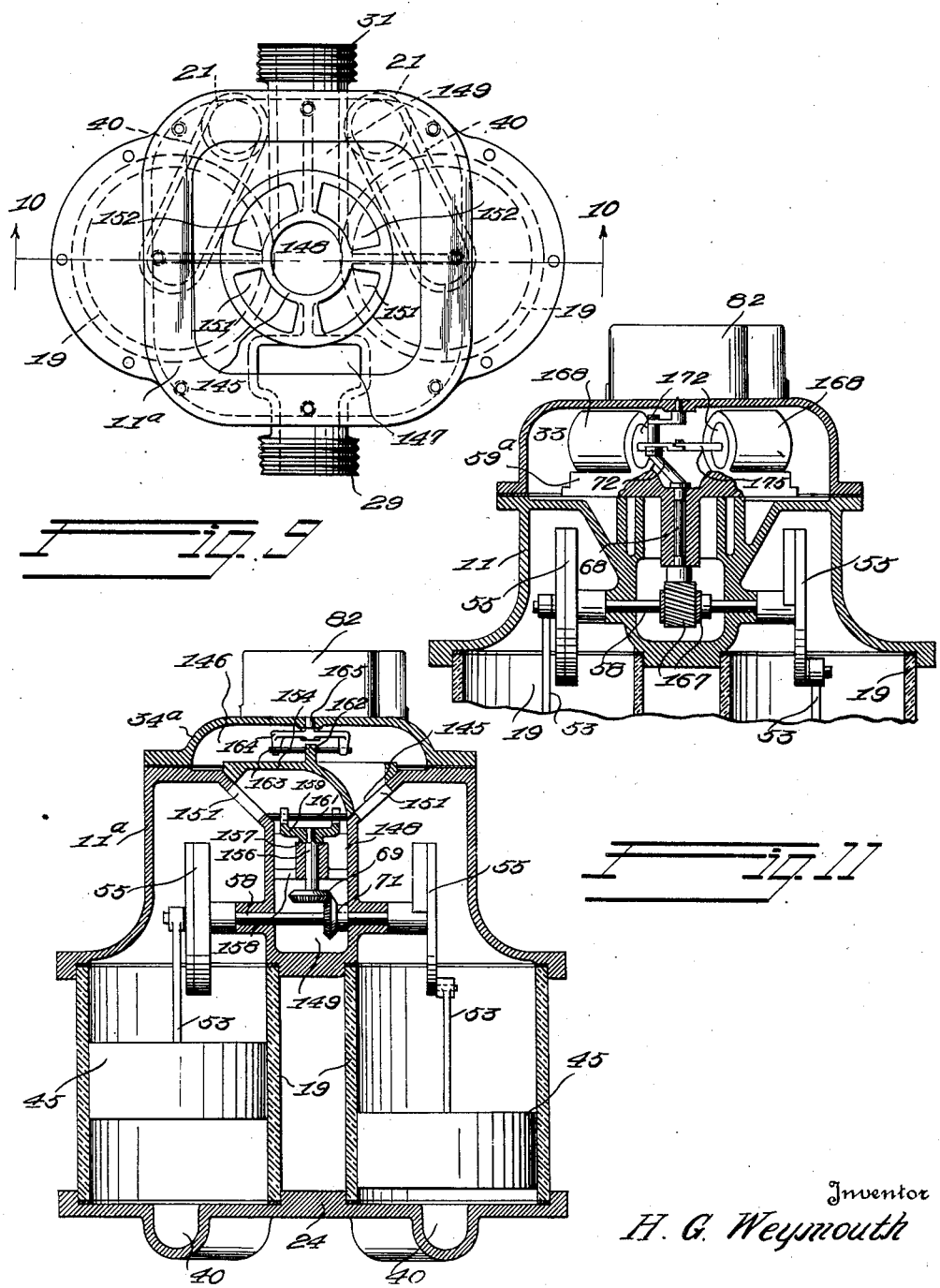

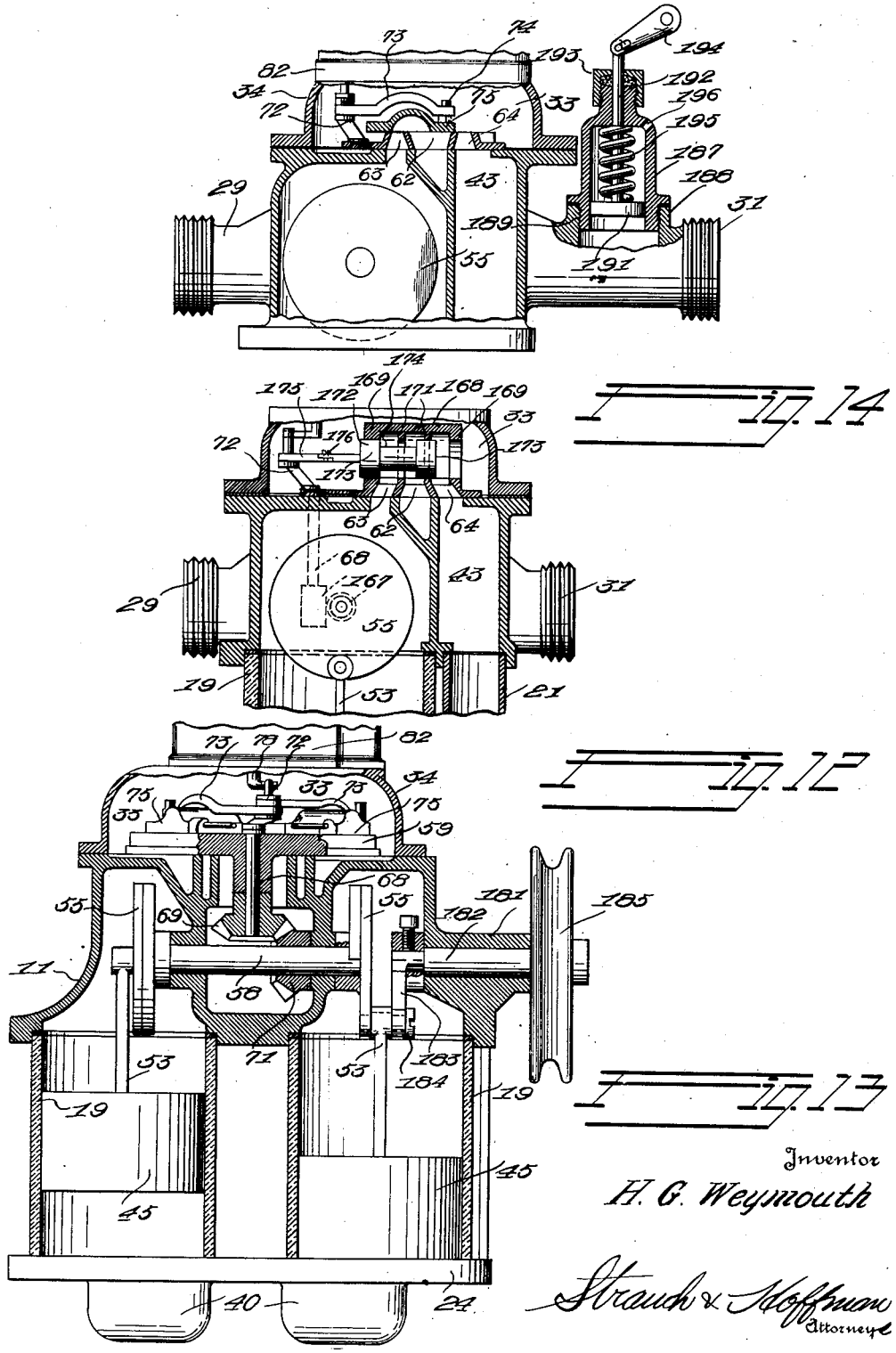

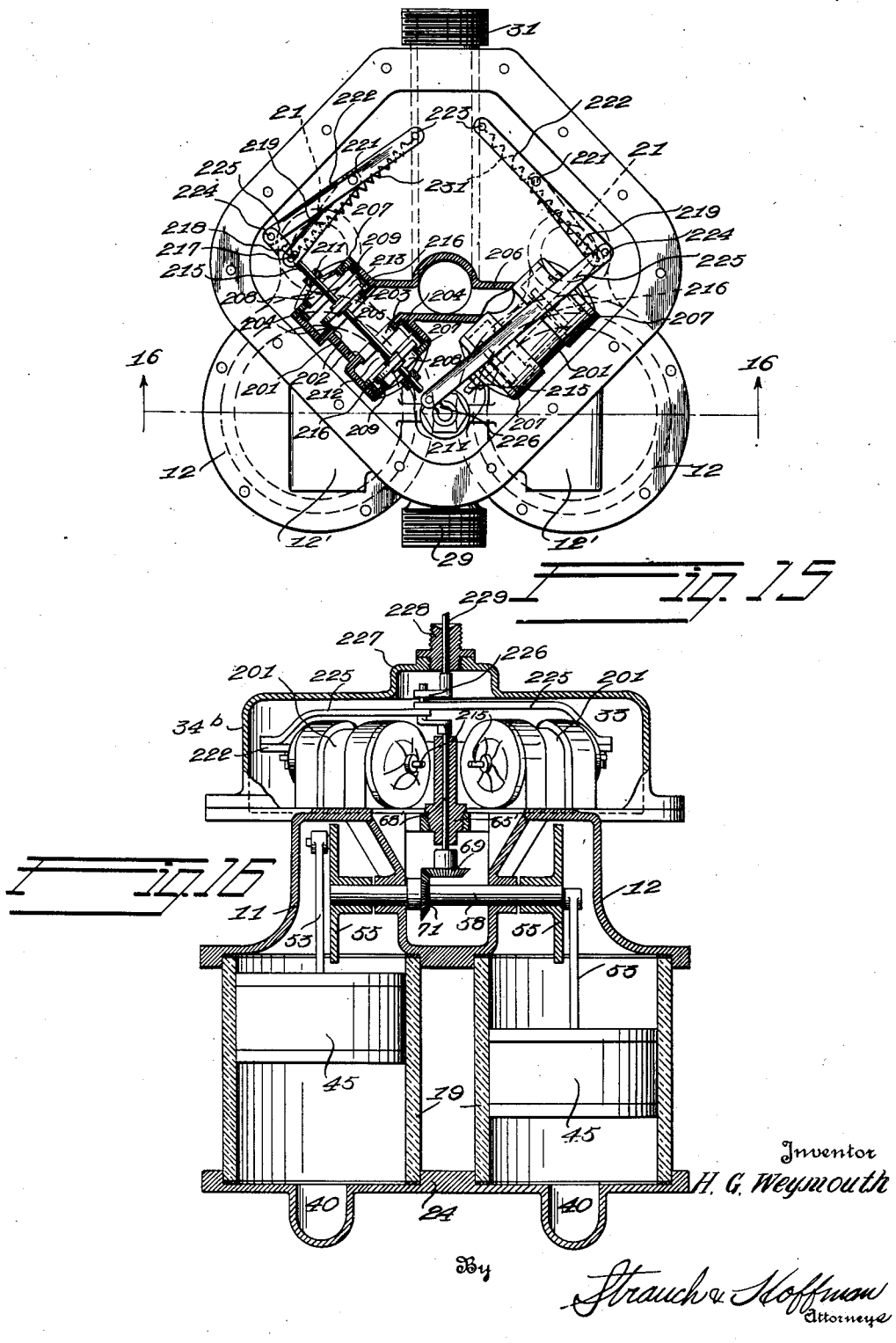

Patented Dec. 20, 1932

1,891,461

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

PISTON TYPE METER

Application filed December 21, 1929. Serial No. 415,716.

The present invention relates to fluid metering mechanisms.

More particularly the invention relates to fluid metering mechanisms of the double acting piston type which, while adapted for fluids of any character are particularly adapted for use as a part of gasoline dispensing apparatus because of certain novel characteristics embodied therein and hereinafter set forth in detail.

Systems have heretofore been proposed for dispensing liquids, such as gasoline, in which the gasoline is supplied under pressure to a discharge hose. The flow of gasoline from the hose of such dispensing system is controlled by a manually operable valve arranged in the discharge end of the hose in a manner so that it is substantially full of gasoline for the next dispensing operation. Such systems have been provided with meters of various types, that are actuated by the flow of gasoline and that communicate their movement to a register, the dial of which and the hands that move thereover being arranged so that they alone are visible to the purchaser of the gasoline. That is, the meter as well as the pump in these constructions are concealed from view, and it is accordingly customary to provide an indicator aside from the register hands to show to the purchaser of gasoline that the system is operating. Such indicators have taken the form of casing, having transparent walls, in which are disposed a device such as a ball that is caused to move by the action of the pump when the system is functioning.

This invention aims to provide a meter designed so that it may be placed in position where its operation may be seen by the purchaser of the liquid to be vended, and including transparent parts so that the actuation of the meter when it is measuring the liquid is visible to the purchaser thereof, and so that the character of the measuring arrangement is apparent to such purchaser. It has heretofore been found desirable in vending gasoline to provide dispensing systems having a visible measuring arrangement. For this reason gasoline dispensing systems involving visible containers have been proposed in which the gasoline is pumped to the desired quantity into a tank having transparent walls from which it is permitted to flow gravitationally to the container of the purchaser. Such systems are still in rather wide use. Said systems, however, have the disadvantage that they are extremely slow in serving the public, because of the fact, principally, that the gasoline is permitted to drain from the measuring container by gravity, and because after each sale the hose extending from the measuring receptacle must be drained before the customer secures the entire amount of gasoline for which he is charged.

This invention aims to provide a visible measuring of the gasoline supplied by a pressure system and to utilize the relatively small measuring chambers, that are very rapidly filled and emptied under pressure, in a manner that will be obvious to the purchaser of gasoline when he sees the meter in operation. The purchaser accordingly may not only be satisfied that the meter is functioning, but may observe the filling and emptying of the chambers and feel that he is securing the amount of gasoline that is indicated by the register, which, in the invention of this application, is embodied with the meter in well known manner, so as to show the amount of liquid that has been passed through the several chambers of the meter.

The primary object of the invention accordingly is to provide a visible meter, the parts of which are constructed so that not only the fact that the meter is operating is apparent to the user of the meter, but that the manner of its operation is likewise apparent when such liquids as gasoline are dispensed, so that the advantages of a visible measuring system are secured without the disadvantages of the visible systems now in use. To this end, the walls of the measuring chambers of the meter are made of transparent material, so that the flow of liquid through said chambers is apparent to the purchaser as well as the operation of the pistons in their reciprocatory motion back and forth in said chamber.

A further object of the present invention is to provide fluid pump and metering mechanisms embodying a minimum number of relatively simple parts, said parts removably connected together in a manner to facilitate expeditious assembly and disassembly of the mechanisms for cleaning or repair thereof.

A further object of the invention is to provide fluid dispensing and metering mechanisms of the type that comprises a plurality of measuring chambers discharging successively into a common discharge conduit under the control of valve mechanisms individual to each chamber in which the valves are associated with the pistons in the measuring chambers so that a substantially smooth flow is secured and so that "dead center" positions of the parts are avoided.

A still further object of the invention is to provide a combined fluid pump and meter mechanism comprising ported valve supporting means, having fluid inlet and outlet connections, valve mechanism movably supported on said means for controlling the ports therein, a bottom plate provided with passages, a plurality of cylinders and tubular members removably positioned between said means and said bottom plate in such manner that some of said ports communicate with the outer ends of said cylinders and others of said ports through said tubular members and said passages communicate with the inner ends of said cylinders, pistons in said cylinders, a crank shaft operatively connected with said pistons and said valve mechanism whereby the movement of said pistons imparts movement to said valve mechanism for controlling said ports.

A still further object of the invention is to provide a combined pump and metering mechanism comprising a ported casting provided with inlet and outlet connections, with some of said ports in communication with said outlet connection, a cover supported on said casting and defining therewith a distributing chamber in communication with said inlet connection; cylinders removably supported by said casting with the outer ends thereof in communication with others of said ports, means removably connected with said casting for placing the inner ends of said cylinders in communication with others of said ports, valve means operatively associated with said ports for controlling same, pistons movably disposed in said cylinders, a mechanically driven shaft operatively connected with said pistons for effecting reciprocation thereof in said cylinders, and operative connections between said shaft and said valve means for operating said valves upon reciprocation of said pistons for admitting fluid alternately on opposite sides of said pistons and discharging same through said outlet connection, and registering means operatively connected with said operative connections.

A still further object of the invention is to provide fluid metering mechanism comprising measuring means and registering means, each of said means comprising a rotatable shaft, and adjustable friction drive means between said shafts for readily altering the relative speed of said shafts to provide a correct reading on said registering means.

A still further object of the invention is to provide a fluid meter embodying a plurality of cylinders having pistons reciprocably mounted therein and valve mechanism to control the admission of fluid under pressure alternately into opposite ends of said cylinders on opposite sides of said pistons and to simultaneously discharge fluid from the opposite sides of said pistons in which the valve mechanism is operatively connected with the pistons by connections that include yielding means for permitting smooth operation over possible dead center positions of the operating parts.

With the above objects in view as well as others that will become apparent during the course of the following disclosure reference will be had to the accompanying drawings forming part of same and wherein:

Figure 1 is a top plan view of a meter constructed in accordance with one embodiment of the invention, the valve housing and valve mechanism being omitted in order to clearly disclose the fluid port arrangement in the crankshaft housing.

Figure 2 is a vertical sectional view substantially on a plane represented by line 2—2 in Figure 1.

Figure 3 is a broken vertical sectional view taken on planes represented by the broken line 3—3 in Figure 1, the section further including the ported casting of crankshaft housing.

Figure 4 is a horizontal sectional view through the stuffing box housing disclosing the adjustable drive connection between the stuffing box spindle and the registering mechanism drive shaft embodied in the present invention.

Figure 5 is a vertical sectional view on a plane represented by line 5—5 in Figure 4.

Figure 6 is a top plan view of a meter constructed in accordance with a modification of the invention, the valve cover plate being omitted for clearly disclosing the valve mechanism.

Figure 7 is a vertical sectional view substantially on planes represented by the broken line 7—7 in Figure 6.

Figure 8 is a fragmental vertical sectional view longitudinally of the valve mechanism particularly disclosing the port arrangement and the valve actuating means.

Figure 9 is a top plan view of a still further modified form of meter construction, the valve cover and valve being omitted for clearly disclosing the valve seat and fluid port arrangement.

Figure 10 is a vertical sectional view on a plane represented by line 10—10 in Figure 9.

Figure 11 is a fragmental vertical sectional view similar to Figures 2, 7 and 10 disclosing a still further modification of the invention.

Figure 12 is a fragmental vertical sectional view of the construction illustrated in Figure 11, the view being taken at right angles to that disclosed in Figure 11.

Figure 13 is a vertical sectional view similar to Figure 2 disclosing a combined pump and meter construction forming a further embodiment of my invention.

Figure 14 is a fragmental vertical sectional view of the construction illustrated in Figure 13 at right angles thereto particularly disclosing an automatic motor control mechanism associated with the pump and meter construction.

Figure 15 is a top plan view partially broken away and in section of a still further modification of the invention.

Figure 16 is a vertical sectional view substantially in a plane represented by line 16—16 in Figure 15.

Referring to the drawings by reference characters, in which like characters designate like parts and referring first to Figures 1 to 5, 11 designates a ported casting which as hereinafter described provides a support for the valve mechanism and operating means therefor and in effect provides a crank shaft housing. The casting 11 is of general rectangular form in plan as indicated in Figure 1 and embodies a skirt portion 12 and a marginal flange 13. The casting 11, as is indicated in Figures 1 and 2, is of skeleton formation necessitated in defining the ports and providing walls of said ports. Said walls are indicated at 14. The skirt portion 12, and a central body portion 16 are formed, as indicated in Figures 2 and 3, to define circular seats 17 and 18.

Removably disposed in seats 17 are the outer ends of transparent cylinders 19 and removably disposed in seats 18 are the outer ends of tubular members 21 which are preferably cylindrical as indicated. The inner ends of cylinders 19 and tubular members 21 are removably disposed in circular seats 22 and 23 respectively in a bottom plate 24. Suitable gaskets 25 and 26 are preferably disposed between the opposite ends of cylinders 19 and tubular members 21 and the bottoms of their respective seats for providing fluid tight connections. The plate 24 is removably secured to casting 11 by means of a plurality of vertically disposed bolts 28, which, as indicated in Figure 2, extend through the margin of plate 24 and are threaded into the margin of skirt portion 12.

By this construction, casting 11, cylinders 19, tubular members 21 and bottom plate 24 are removably secured together, whereby the parts may be expeditiously disassembled for cleaning, repairing or replacement of parts, it being only necessary to remove bolts 28 to effect separation of these parts which parts may be re-assembled as expeditiously.

The casting 11 embodies an inlet connection 29 and an outlet connection 31 adapted for connection with supply and distributing lines. The inlet connection 29 communicates with a chamber 32 in casting 11, which chamber, as clearly indicated in Figure 1, is in communication through the outer face of casting 11 and consequently in communication with a distributing chamber 33 defined by the outer face of casting 11 and a valve cover 34, which is removably secured to casting 11 by suitable securing elements, extended through a flange 35 of cover 34 and flange 13, a suitable gasket 36 being interposed between flanges 13 and 35 to provide a fluid tight connection between casting 11 and cover 34. Casting 11 is provided with ports 37 in communication with outlet connection 31, as well as through the outer face of casting 11. The casting 11 is further provided with a pair of ports 38 in communication with the outer ends of cylinders 19 and opening through the outer face of casting 11. Said casting is further provided with a pair of ports 39 communicating with the outer ends of tubular members 21.

The bottom plate 24 is provided with a pair of passages 40 respectively putting cylinders 19 in communication with the tubular members 21, above referred to.

It will be seen upon inspection of Figures 1, 2 and 3, that casting 11 is of such construction that chamber 32 is separated from chambers 41 above cylinders 19 by ribs or webs 42 and that chambers 41 are separated from chambers 43 above tubular members 21 by ribs 14, and that ports 38 and 39 communicate with chambers 41 and 43 respectively which in turn are in communication with cylinders 19 and tubular members 21 respectively.

Disposed in each of the cylinders 19 is a piston 45 adapted for vertical reciprocation therein by alternating fluid pressures on the opposite sides thereof in a manner hereinafter described. The pistons 45 may be of any desired construction, but preferably each comprises a metallic cup member 46 open at the outer end thereof and engaged with the closed bottom of each cup member 46 and an outer marginal flange 47 thereof is a fluid sealing washer 48 which is removably secured in position by an angular metallic ring 49 through which and washer 48 and into cup member 46 extend screws 51, the washers 48 yieldably engaging the inner walls of cylinder 19 in a fluid tight manner. Suitably secured in and extending diametrically of each piston 45 adjacent the bottom thereof is a resilient wrist pin 52 which is operatively engaged by the inner end of a connecting rod 53, the outer end of which rotatably engages a crank pin 54 secured adjacent the margin of a crank disk 55. The crank disks 55 are disposed in chambers 41 and partially project into the outer ends of cylinders 19 as indicated in Figures 2 and 3 and as particularly indicated in Figure 1 portion 12 is extended at 12′ to accommodate disks 55. Preferably each of the crank disks 55 is provided with a counterweight 56 diametrically opposite pin 54. The disks 55 have integral hub portions 57 which are suitably secured to the opposite ends of a shaft 58, which shaft is suitably journaled in a fluid tight manner in casting 11 and extends through chamber 32 as indicated in Figure 2.

By the provision of the resilient pins 52, any compression which might occur in cylinders 19 as pistons 45 cross dead center is readily compensated for. In order to prevent flexing of pins 52 beyond their elastic limit and still permit sufficient flexing to compensate for cylinder compression at the dead center points of the pistons, the pins 52 as is clearly illustrated in Figure 2, extend through holes 50 of slightly greater diameter than pins 52 in lugs 52a disposed immediately adjacent opposite sides of connecting rods 53 and removably secured to the closed bottom of cup member 46 by means of threaded studs 52b integral with lugs 52a and extending through said bottom with the inner ends thereof engaged by nuts 52c for firmly drawing lugs 52a into engagement with said closed bottom and with the centers of holes 50 in alinement with centers of the pin receiving holes in connecting rods 53. Thus it will be seen that by the construction disclosed the resilient pins 52 are capable of limited flexing for compensating for compression in the cylinders when the pistons pass dead center but are prevented from flexing beyond their elastic limit.

The outer face of casting 11 is accurately machined for fluid tight contact therewith of a similarly-machined bottom portion of a one piece valve seat 59, which valve seat is removably secured to casting 11 by securing elements projected into taps 61 in the outer face of casting 11. Seat 59 is provided with pairs of ports 62, 63 and 64 aligning with ports 37, 38 and 39 in casing 11, respectively as indicated in Figure 3. The seat 59 includes an extension 65 forwardly of the ports as indicated in Figure 3, and as shown by dot and dash lines in Figure 1. Extension 65 is provided with an integral vertical projection 66 which as indicated in Figure 2 projects into chamber 32. The projection 66 is provided with a vertical central bore 67 in which is rotatably journaled a crank shaft 68, which, at the inner end thereof, has secured thereto a bevel pinion 69 in meshing engagement with a similar pinion 71 secured to shaft 58. Secured to the outer end of crank shaft 68 is a crank 72 to which is rotatably secured the inner ends of valve actuating arms 73, the opposite ends of which arms are rotatably engaged with pins 74 on the outer ends of slide valves 75, which are reciprocably mounted on valve seat 59 and which are of the arched type commonly employed in gas meter constructions. As indicated in Figures 2 and 3, arms 73 are outwardly bowed in order to span valves 75 and preferably each of the valves 75 has secured thereto one end of a guide rod 76 (Fig. 2) which rod is reciprocably mounted in a suitable guide on seat 59. By providing a single one piece valve seat accurate positioning of the valves and seats is assured.

In the operation of the construction so far described fluid under pressure enters inlet connection 29 into chamber 32 and from thence to the distributing chamber 33 in which fluid is maintained at all times. The valves 75 as indicated in Figure 3 are of such span that not more than two of the ports are in communication therewith at any one time. By reference to Figure 3 it will be seen that valve 75 in one of its positions has placed ports 37 and 38 in communication and has opened port 39 to distributing chamber 33 whereupon fluid will enter port 39 through port 64 in valve seat 59 and will pass through chamber 43, tubular member 21, and passage 40 to the bottom of pistons 45 which at this time is at the limit of its lower stroke whereby the piston 45 will be forced upwardly. Said piston through connecting rod 53 and crank disk 55 will impart rotation to shaft 58 which in turn through pinions 71 and 69 will impart rotation to crank shaft 68 which through crank 72 will impart sliding motion to valves 75, and as piston 45 moves upwardly fluid in chamber 41 will be forced outwardly through ports 38 and 63, and ports 62 and 37 and thence through the outlet connection 31. As the piston 45 continues its upward movement valve 75 through crank 72 and arm 73 will move outwardly until when the piston reaches its upper limit of movement ports 37 and 39 will be in communication and port 38 through port 63 will be in communication with the distributing chamber 33 so that fluid will enter chamber 41 and force piston downward, which will force fluid from the bottom of the piston upwardly through tubular member 21, through chamber 43, ports 39 and 64, and ports 62 and 37 and thence through the outlet connection 31.

It will of course be understood that both pistons 45 operate in the same manner and in order to avoid any dead center action the connecting rods 53 as is indicated in Figure 2 are connected to crank disks 55, 90 degrees apart which connection together with the counterweights 56 and action of resilient pins 52 provide a steady and uniform movement of parts.

By the provision of the transparent cylinders 19 the action of pistons 45 is visible, when as is contemplated the meter is mounted in full view, and consequently well adapts this meter construction to use with gasoline dispensing apparatus. The purchaser of gasoline, due to the relatively high cost thereof and the quantities purchased, is interested in the accuracy of the meter and feels that the measurement is accurate when he sees that a displacement type of meter is used, as indeed it is. The provision of the transparent cylinders renders the moving pistons visible, and the gasoline in course of delivery can accordingly readily be seen so that the purchaser knows of a certainty that the mechanism is operating properly and that he is reasonably assured of receiving the amount of gasoline indicated by the registering mechanism.

By mounting the cylinders in the manner disclosed, they, together with tubular members 21 may be readily removed by removing bolts 28 for facilitating cleaning of the cylinders and repair or replacement of parts.

The crank 72 is in operative engagement with a dog 78 secured to the lower end of a stuffing box spindle 79, which spindle is rotatably journaled in a stuffing box 81 disposed in a casing 82 removably supported on valve cover 34 through lugs 82' and on which the registering mechanism (not shown) is removably mounted. Secured to the outer end of spindle 79 is a friction gear 83. In horizontal alinement with gear 83 in a similar friction gear 84 which is secured to the register shaft 85 the inner end of which shaft is rotatably mounted in a journal 86 threadedly engaged in the outer face of valve cover 34 as indicated in Figure 5.

Interposed between friction gears 83 and 84 is a friction gear 87 in frictional engagement with gears 83 and 84. Gears 83 and 84 each comprise a central disk portion 88 and a transverse circular marginal portion 89, while friction gear 87 comprises a pair of yieldable disks 91. Portions of the rounded margins of gears 83 and 84 are disposed between said disks and in frictional engagement therewith, as indicated in Figures 4 and 5. The yieldable disks 91 are centrally apertured and engaged by a pin 92, which pin opposite the disks is threaded and engaged by nuts 93 whereby upon adjustment of the nuts the disks 91 may be centrally compressed for engaging gears 83 and 84 under greater or less friction. The pin 92 at opposite ends thereof is rotatably journaled in upper and lower reaches 94 and 95 of a lever 96 which lever, at one end thereof, is pivotally mounted, as indicated at 97, for adjustable swinging movement on a post 98, which post is provided with a threaded extension 99 projecting through cover 34 and engaged by a nut 101. The opposite or front end of lever 96 is twisted or otherwise formed as indicated at 102 for providing a vertical flat portion 103, which portion projects into an extension 104 of casing 82 and is engaged at opposite sides thereof by the adjacent ends of adjusting screws 105 threadedly engaged in lugs 106 preferably integral with extension 104. The opposite sides of extension 104 are provided with threaded apertures 107 in alinement with adjusting screws 105 for the insertion of a suitable instrument as a screw driver for manipulation of screws 105. The threaded apertures 107 are normally closed by threaded plugs 108.

By moving lever 96 about its pivot 97 through the adjusting screws 105 the relation between friction gears 83, 84 and 87 can be so adjusted as to readily correct any existing errors between the amount of fluid actually passed, and that indicated by the registering mechanism by changing the relative speed of rotation between spindle 79 and the register shaft 85 by varying the points of frictional engagement between gear 87 and gears 83 and 84 with respect to the center of rotation of gear 87.

In Figures 6, 7 and 8 is disclosed a modified construction wherein the ported casting 11 of the previous construction is replaced by a ported casting or crank shaft housing 111. The casting 111 as in the first form of the invention is provided with the seats 17 for detachable engagement of the outer ends of the transparent cylinders 19, whose inner ends detachably engage the seats 22 in the bottom plate 24a, which plate is removably connected with casting 11 by bolts in the manner disclosed with reference to the first form of the invention for removably maintaining the cylinders 19 between casting 11 and bottom plate 24a. Tubular members 21 are also removably disposed between casting 111 and bottom plate 24a with the opposite ends thereof engaged in seats in casting 111 and bottom plate 24a as hereinabove disclosed, but in accordance with this form of the invention the tubular members 21, which may also be made transparent, are disposed on opposite sides of the common vertical center plane of cylinders 19, as is clearly indicated in Figure 6, and the bottom plate 24a is accordingly provided with passages 40a which communicate with the bottom of tubular members 21 and cylinders 19, as is indicated in Figure 6.

The casting 111 embodies a central depressed portion 112 defining with a removable valve cover plate 113 a distributing chamber 114. The inlet connection 29 communicates with a chamber 115 in casting 111, which chamber in turn communicates with the distributing chamber 114. The outlet connection 31 is in communication with a passage 116 which as indicated in Figures 6 and 8 extends substantially the entire width of casting 111. The bottom wall 117 separating chamber 114 from outlet passage 116 is, as is more clearly indicated in Figure 8 provided with integral vertical extensions providing a pair of valve seats 118, in vertically spaced relation to wall 117, which extensions define fluid ports for distributing fluid to opposite sides of pistons 45 as well as providing through the valve arrangement hereinafter described for the passage of fluid alternately from opposite sides of the pistons to the outlet passage 116. The ports common to each seat 118 comprise a central relatively large port 119 in communication with passage 116, a port 121 communicating with the outer end of the adjacent tubular member 21 for admitting fluid to the bottoms of cylinders 19, and a port 122 communicating with the outer end of the adjacent cylinder 119.

As will be observed from Figure 6, the valve seats 118 are disposed between cylinders 19 and on opposite sides of the common vertical center plane thereof, the seats being disposed in parallel relation slightly offset in the direction of cylinders 19.

Cooperating with each of the seats 118 is a slide valve 124, which at the outer end thereof is provided with ears 125 between which is pivotally secured as indicated at 126 the outer end of a valve actuating arm 127. The arms 127 which are disposed in parallel relation and slightly offset laterally are connected at their inner or adjacent ends to cranks 128 of a crankshaft 129 which crankshaft is horizontally disposed in vertical alinement with the centers of cylinders 19 and extends through the distributing chamber 114. The shaft 129 adjacent the opposite ends thereof is rotatably journaled in bosses 131 integral with casting 111 and keyed as indicated at 132 to each end of shaft 129 is a crank disk 55' similar to the disk 55 in Figures 1 and 2 and each of which is provided with a crank pin 54 to which is rotatably connected the outer end of the connecting rod 53 which at the inner end thereof is connected with piston 45 through resilient pins as disclosed in Figure 2. The pistons 45 may be of the construction disclosed in Figure 2 or as indicated in Figure 7 each piston may be provided with a plurality of rings.

The casting 111 is provided with vertical caplike extensions 133 for accommodating the outer portions of disks 55' and one of the portions 133 merges into a change gear reduction housing 134 integral with casting 111.

The crankshaft 129 is provided with a reduced extension providing a stuffing box spindle 136 rotatably journaled in a stuffing box 137 in housing 134. The spindle 136 is provided on the end thereof with a pinion 138 in meshing engagement with a gear 139 connected to the register drive shaft 141, which is in operative connection with suitable registering mechanism arranged in a casing 142 suitably secured to housing 134.

In accordance with this embodiment of the invention slide valves substantially of the character disclosed in the first form of the invention are utilized for controlling the ports 119, 121 and 122. In this form of the invention however the valves 124 are disposed in parallel relation on opposite sides of the vertical center plane of cylinders 19 as distinguished from the angular disposition of valves 75 in the first form of the invention. If desired, pinion 138 and gear 139 may be replaced by the adjustable friction drive means disclosed in Figures 2, 4, and 5.

The operation of this form of the invention is substantially the same as that above described with reference to the first form of the invention wherein pistons 45 are vertically reciprocated within cylinders 19 by fluid pressure alternately on opposite sides thereof, the fluid being admitted from the distributing chamber 114 through ports 121 and 122 alternatively to the bottoms and tops of cylinders 19 by valves 124, which through arms 127 operatively connected with crankshaft 129 are reciprocated on valve seats 118 by vertical movement of pistons 45 for controlling the ports, the outlet ports 119 by means of valves 124 being placed alternatively in communication with ports 121 and 122 whereby fluid on one side of the pistons is expelled through the outlet passage 116 while fluid under pressure is being admitted to the other side of the piston.

This form of the invention while similar to the first form and operating in the same general way, is simpler in construction and cheaper to manufacture. By the provision of the horizontal crankshaft 129 a smooth operating drive for the registering mechanism in casing 142 which is parallel with shaft 129 is provided, since the thrust on the valves is in planes parallel to their line of movement in all positions of the crank pins.

A still further embodiment of the invention is disclosed in Figures 9 and 10, which comprises the same general construction disclosed in the first form of the invention, but wherein a rotary valve is substituted for the slide valves for controlling the fluid ports.

Referring to Figures 9 and 10 a ported casting 11a is provided which is of the same general configuration as casting 11 in the first form of the invention. In accordance with this embodiment of the invention the transparent cylinders 19 and fluid conducting tubular members 21 are removably disposed between casting 11a and the bottom plate 24 in the same manner and in the same relative position as in the first form of the invention, as is clearly disclosed in Figures 9 and 10, and accordingly this portion of the construction will not be again described.

The casting 11a is provided with a centrally disposed conical depression in the outer face thereof provided with a conical valve seat 145. A valve cover 34a is removably secured to the outer face of casting 11a defining with casting 11a a distributing chamber 146 which through chamber 147 is in communication with the fluid inlet 29. The valve seat 145 is provided with a central circular port 148 in communication with an outlet passage 149 in casting 11a which is in communication with the outlet connection 31. The seat 145 further is provided with a port 151 in communication with the outer end of each of the cylinders 19 and a second port 152 in communication with the outer end of each of the adjacent tubular members 21, which, as before stated, communicate through passages 40 with the inner ends of cylinders 19.

Cooperating with the valve seat 145 is a rotary frusto-conical valve 154 which is provided with suitable ports for admitting fluid from the distributing chamber 146 alternately to opposite sides of pistons 45 for effecting reciprocation thereof and discharging the fluid on the compression sides of pistons to the outlet passage 149 in the same manner as disclosed in the previous embodiment of the invention.

The crank disks 55 are secured to the opposite ends of a shaft 58, as in the first embodiment of the invention, to which shaft is secured the bevel pinion 71 which pinion is in driving engagement with pinion 69 secured to the inner end of a vertical shaft 156 corresponding to the crankshaft 68 in the first form of the invention. Shaft 156 is rotatably journaled in a bearing 157 disposed centrally of outlet port 148 and integrally connected with casting 11a by webs 158. Secured to the outer end of shaft 156 for rotation therewith is a yoke member 159 which is in driving engagement with a pin 161 suitably secured to valve 154 in diametrical relation thereto, whereby the reciprocating movement of pistons 45 impart rotational movement of valve 154 for controlling the various fluid ports for admitting fluid to the opposite sides of pistons 45 from chamber 146 and discharging fluid from the compression sides of the pistons to the outlet passage 149.

Valve 154 is provided with an integral projection 162 in vertical alinement with shaft 156 and in which is suitably secured the intermediate portion of a drive pin 163 the opposite ends of which are in driving engagement with the opposite ends of a yoke member 164, which is secured to the inner end of a stuffing box spindle 165, which spindle is in operative connection with adjustable friction drive mechanism disposed in casing 82 as disclosed in the first form of the invention or any other convenient registering mechanism.

In Figures 11 and 12 is disclosed a still further modification of my invention which is of the same general construction as that disclosed in Figures 1 to 5 but wherein the fluid ports are controlled by piston valves instead of straight slide valves. In this embodiment of the invention parts corresponding to similar parts in Figures 1 to 5 are given like reference characters and will not be described.

Referring to Figures 11 and 12 the drive connection between shafts 58 and 68 comprises a pair of worm gears 167, as distinguished from the bevel pinions 69 and 71 in the construction disclosed in Figures 1 to 5.

In accordance with this embodiment of the invention the valve seat 59a of the same general construction as valve seat 59 is provided with integral cylinders 168, which, as indicated in Figure 11, are disposed in the same angular relation as valves 75 in Figures 1 to 5. The cylinders 168 are open-ended for communication with the distributing chamber 33, and each cylinder 168 is provided with end flanges 169 and a pair of intermediate flanges 171. Seat 59a between the flanges 169 and 171 of each cylinder 168 is provided with ports 62, 63 and 64 in alinement with ports 37, 38 and 39 in the same manner as disclosed in Figures 1 to 5.

Reciprocably mounted in each of the cylinders 168 is a piston 172 which as indicated in Figure 12 embodies end portions 173 for fluid sealing engagement with the inner circular walls of flanges 169 and 171, and an intermediate reduced cylindrical portion 174, whereby, as is clearly indicated in Figure 12, either port 63 or 64 will always be in communication with outlet port 62, the reduced cylindrical portion 174 of piston 172 permitting the passage of fluid from one side to the other of either of the flanges 171 of cylinder 168.

The pistons 172 are operatively connected with crank 72 of crankshaft 68 by arms 175 pivotally connected at 176 for compensation between the rotatable movement of crank 72 and the reciprocating movement of pistons 172.

The operation of the construction according to this embodiment of the invention is the same as that disclosed in Figures 1 to 5 as the fluid ports are controlled by the piston valves in the same manner as the ports are controlled by the slide valves in the first form of the invention.

In accordance with the various meter constructions herein before disclosed, fluid is admitted to the distributing chamber under pressure by suitable pumping or similar mechanism and the pistons are reciprocated under the action of fluid pressure admitted to opposite sides thereof from the distributing chamber in the manner herein above disclosed.

The constructions comprising the piston and valve mechanisms above disclosed will act as suction pumps for drawing fluid through the inlet connection 29 to the distributing chamber and forcing the fluid alternately from opposite sides of the pistons through the outlet connection 31 if the pistons are mechanically operated and this invention contemplates such use of the apparatus disclosed.

A single modified embodiment in the form of a combined pump and meter is disclosed in Figures 13 and 14. The construction herein disclosed is substantially identical with that disclosed in Figures 1 to 5 with the exception that shaft 58 is mechanically driven. As indicated in Figures 13 and 14 casting 11 at one side thereof is provided with an integral extension 181 providing a bearing for shaft 182 in horizontal alinement with the valve drive shaft 58. The inner end of shaft 182 is provided with a crank 183 to the end of which one of the connecting rods 53 is rotatably secured by a pivot pin 184 replacing the corresponding pin 54 of Figure 2. This connection provides for simultaneous rotation of shafts 58 and 182.

Secured to the outer projecting end of shaft 182 is a drive pulley 185 which may be of any desired construction adapted to receive a drive belt for rotating shaft 182 and consequently shaft 58 for imparting reciprocation to pistons 45 and simultaneously actuating valves 75 for admitting fluid to opposite sides of pistons 45 and discharging same to the outlet connection whereby a double acting combined pump and meter construction is provided for drawing fluid into the inlet connection 29 and forcing same through the outlet connection 31.

The construction preferably embodies means operable by fluid pressure for automatically controlling a motor for operating the pump at a substantially constant outlet fluid pressure. Such means, in a preferred embodiment thereof illustrated in Figure 14, comprises a cylindrical casing 187 detachably threaded into a vertical extension 188 of outlet 31 as indicated at 189. Reciprocably mounted in casing 187 is a piston 191 provided with a stem 192 reciprocably mounted in a stuffing box 193 carried by casing 187. The outer end of stem 192 has a linked connection 194 with a motor switch for opening and closing the switch upon vertical movement of stem 192. A helical spring 195 is disposed between piston 191 and the outer wall of casing 187 in surrounding relation to stem 192 for yieldably urging piston 191 inwardly against the pressure in outlet 31. The casing 187 is provided with a vent 196 for avoiding air compression within casing 187 upon movement of piston 191 therein.

In operation of the means disclosed piston 191 upon a drop in pressure in outlet 31 due to opening of the discharge nozzle, for example, will be forced downwardly by the action of spring 195 thus moving stem 192 downwardly and through link 194 closing the motor switch starting the operation of the pump and meter. Upon an increase of pressure in outlet 31 to a predetermined point as by closing the discharge nozzle piston 191, through the action of said pressure will be forced upwardly thus moving link 194 for automatically opening the motor switch and stopping the pump.

The combined pump and meter construction disclosed is well adapted for use with gasoline dispensing apparatus as by the provision of the transparent cylinders 19 the operation of the pistons is clearly visible whereby the operative condition of the pump can readily be ascertained.

While the construction disclosed in Figures 13 and 14 comprises valve mechanism of the character disclosed in the meter construction of Figures 1 to 5, it is obvious that the modified valve constructions of Figures 6 to 12 inclusive may be substituted for the angularly disposed slide valves 75.

While the meter constructions disclosed in Figures 1 to 12 inclusive embody fluid pressure operated pistons operatively associated with valve mechanism for controlling fluid ports for alternately admitting fluid to opposite sides of the pistons and discharging fluid from the pressure sides of the pistons, any of the meter constructions disclosed may readily be converted into a combined pump and meter mechanisms by providing mechanical drives for the piston operated and valve operating shafts in the manner disclosed in Figs. 13 and 14, thus well adapting them to service in connection with gasoline dispensing apparatus as the transparent cylinders make the operating pistons visible whereby the accurate operation is more easily ascertained and by providing a combined pump and metering mechanism in one compact unit the gasoline delivery apparatus is greatly simplified, and rendered substantially less costly.

By the elimination of the registering mechanism in the construction disclosed in Figures 13 and 14 a pump per se is provided which is well adapted for service, where pumping action alone is desired.

It will be obvious from the above that by the elimination of the registers in the constructions disclosed in Figures 6 to 12 and providing a mechanical drive for the valve actuating shafts, pumps provided with the various modified valve mechanism therein disclosed will be provided.

In Figures 15 and 16 is disclosed a still further modification of the invention which is of the same general construction as the embodiment of the invention disclosed in Figures 1 to 3, except that the slide valve mechanism of the form of the invention disclosed in Figures 1 to 3 is in the present embodiment of the invention replaced by snap acting poppet valve mechanism.

In accordance with the present embodiment of the invention a pair of angularly disposed casing members 201 are rigidly or integrally supported on casting 11 in the distributing chamber 33 provided by casting 11 and a valve cover 34b and with which the inlet connection 29 is in communication.

The casings 201 are each provided adjacent the center thereof with spaced flanges 202 provided with central openings 203 surrounded by oppositely or outwardly facing valve seats 204 preferably integral with flanges 202.

The flanges 202 define chambers 205 in casings 201 which are in communication with outlet 31 through a conduit 206 integral with casings 201 and casting 11.

Each of the casings 201 is further provided in each end thereof with a removable cap 207 each of which is provided with a central opening 208 surrounded by an inwardly facing valve seat 209 and each cap 207 is further provided with a valve stem guide 211.

One of the caps 207 of each casing 201 defines with the adjacent flange 202 a chamber 212 in communication with the outer end of the adjacent cylinder 19 and the other cap 207 of each casing 201 defines with the adjacent flange 202 a chamber 213 in communication with the outer end of the adjacent tubular member 21 which tubular member communicates with the inner end of the adjacent cylinder 19 in the manner disclosed in Figures 1 to 3.

It will be noted that in this embodiment of the invention the vertical axes of the corresponding cylinders 19 and members 21 are equally spaced from the axis of outlet 31.

The openings 203 and 208 in casings 201 are controlled by poppet valves for alternately placing either chamber 212 or chamber 213 in communication with outlet 31 and the other chamber 212 or 213 in communication with the distributing chamber 33 for alternately admitting fluid pressure to opposite sides of pistons 45 and placing cylinders 19 on the opposite sides of the pistons in communication with outlet 31 substantially in the same manner above disclosed relative to the slide valves in Figures 1 to 3.

The valve mechanism comprises a valve stem 215 slidably guided in the guides 211 carried by caps 207 of each casing 201. Each stem 215 is provided with a pair of disk valves 216 in such spaced relation as to simultaneously engage in a fluid sealing manner one of the seats 204 and the opposite seat 209 as indicated in Figure 15 in one position thereof and to engage the other pair of seats 204 and 209 in the other position thereof.

The stems 215 are actuated in the following manner in order to shift valves 216 from one position to the other as well as to hold the valves in either position.

The outer end of each stem 215 is provided with a right angular pin or extension 217 loosely disposed in an elongated slot 218 in the adjacent end of a link 219. The opposite end of link 219 is pivotally connected as at 221 to an intermediate portion of a link 222 one end of which is pivotally connected to casting 11, as at 223, and the opposite of which is pivotally connected as at 224 to the outer end of an actuating arm 225.

The inner or adjacent ends of arms 225 are pivotally connected to a crank 226, which crank is connected with, and rotated by the crank shaft 68' rotatably journalled in a bearing 65' removably mounted in casting 11.

Due to the relatively great height of casings 201 the valve cover 34b is provided with a centrally disposed raised portion 227 to accommodate the crank 226 and portion 227 is provided with a detachable stuffing box spindle bearing member 228 in which the spindle 229 is rotatably journalled.

A helical spring 231 is associated with each pair of links 219 and 222 and has the opposite ends thereof secured to the respective pin 217 and pivotal connection 223 for yieldably maintaining links 219 and 222 in angular position for holding valves 216 in engagement with one pair of seats or the other pair in each casing 201 depending upon the relative position of pivot 221, which is moved upon reciprocation of arms 225 by the crank 226.

In operation of the construction disclosed fluid enters the distributing chamber through inlet 29, from whence it is alternately admitted to opposite ends of pistons 45 by the valve mechanism disclosed for effecting reciprocation of the pistons which in turn impart rotation to crank 226 causing reciprocation of arms 225, which arms swing links 222 about their pivots 223 which swinging movement of links 222 alternately move pivots 221 from one side to the other of the center line of pivots 217 and 223 causing springs 231 to swing link 219 about pivot 221 with a snap action for moving valves 216 from engagement with one pair of seats into engagement with the other pair of seats for alternately placing opposite sides of cylinders 19 in communication with chamber 33 and the respective opposite sides of cylinders 19 in communication with outlet 31.

The operation can be more clearly understood upon reference to Figures 15 and 16 in which the left piston 45 is near the limit of its upward stroke with chamber 33 in communication through casing chamber 213 with the bottom of cylinder 19 and the top of the same cylinder in communication with outlet 31 through casing chamber 212, opening 203, chamber 205 and conduit 206.

Upon downward movement of this piston 45 arm 225 through crank 226 will swing link 222 causing pivot 221 to approach the center line of pivots 217 and 223 and as pivot 221 passes said center line spring 231 will throw the outer end of link 219 in the opposite direction with a snap action resulting in valves 216 instantaneously engaging the opposite pair of seats 204 and 209, thereby placing the upper end of cylinder 19 in communication with chamber 33 through casing chamber 212 and opening 208 and placing the lower end of cylinder 19 in communication with outlet 31 through chamber 213, opening 203, chamber 205 and conduit 206.

It will of course be understood that the valve controlling the opposite cylinder 19 operates in the same manner but in different timed relation, one piston 45 being preferably arranged one quarter stroke in advance of the other.

In accordance with this embodiment of the invention a piston meter is provided which comprises valve mechanism of the spring trip or snap acting type whereby the fluid controlling openings and chambers are controlled simultaneously with change of piston stroke thus providing a more effective meter construction.

The meter construction disclosed may be provided with the adjustable drive mechanism between the stuffing box spindle and the register drive shaft in the manner disclosed in Figures 1 to 3. Furthermore the shaft 58 may be mechanically driven in the manner disclosed in Figs. 13 and 14 for providing a combined pump and metering mechanism.

It will be seen from the foregoing disclosure that pump and meter mechanisms are provided which are constructed of relatively few simple parts and that the parts are detachably connected in a manner to facilitate the ready assembly or dis-assembly of the mechanisms whereby same may be readily cleaned or repaired.

By the provision of the novel adjustable friction drive transmission mechanism between the suffing box spindle and the register drive shaft, sensitive adjustments can readily be made to alter the speed of the shaft relative to the spindle for correcting any existing errors between the quantity of fluid actually dispensed and that indicated by the registering mechanism.

While I have disclosed certain specific embodiments of my invention, same are to be considered as illustrative only and not restrictive since the scope of the invention is defined in the subjoined claims.

What I claim and desire to secure by United States Letters Patent is:—

1. A meter for a gasoline dispensing system comprising a ported valve supporting member provided with inlet and outlet connections; with some of said ports in communication with said outlet connection; a cover supported on said member defining therewith a distributing chamber in communication with said inlet connection; a plurality of cylinders connected to said member and with corresponding ends of the cylinders communicating with others of said ports; means connected to said member and said cylinders for effecting communication between the opposite ends of said cylinders and the others of said ports; pistons reciprocably mounted in said cylinders; a connecting rod secured to each piston; a crankshaft disposed in said distributing chamber and having cranks to which the connecting rods are secured; and valve means operatively cooperating with said ports and operable by the crank and crank shaft by movement of said pistons for admitting fluid alternately in opposite ends of said cylinders for effecting reciprocation of said pistons therein, and for discharging fluid through said outlet connection.

2. The construction defined in claim 1 including means whereby said cylinders and said first means are removably connected with said ported valve supporting member for facilitating ready assembly and disassembly thereof.

3. A meter for a gasoline dispensing system comprising a ported casting provided with inlet and outlet connections; with some of said ports in communication with said outlet connection; a cover secured to said casting and defining therewith a distributing chamber in communication with said inlet connection; cylinders removably supported by said casting, with the adjacent ends thereof in communication with others of said ports; conduit means removably supported by said casting for providing communication between the other ends of said cylinders and the others of said ports; means whereby said cylinders and conduit means are removably supported by said casting; reciprocating pistons in said cylinders; valve means in said distributing chamber and associated with said ports; and operative connections between said pistons and said valve means whereby said valve means are operated by movement of said pistons for alternately admitting fluid from said distributing chamber to opposite sides of said pistons and discharging fluid through said outlet connection.

4. The construction defined in claim 3 and including a bottom plate having seats thereon, said casting being provided with seats, said cylinders and said conduit means at the corresponding ends thereof engaging said seats in said casting, said cylinders and said conduit means being removably secured to said casting by said bottom plate, the other ends of said cylinders engaging the seats of said bottom plate, said conduit means also engaging seats in said bottom plate, and removable attachment bolts securing said plate to said casting.

5. A meter for a gasoline dispensing system comprising a ported casting provided with inlet and outlet connections with said outlet connection in communication with some of said ports; a cover supported on said casting providing therewith a distributing chamber in communication with said ports and said inlet connection; valve means movably supported by said casting in said chamber for controlling said ports; a plurality of cylinders removably engaging said casting at corresponding ends thereof with said ends in communication with others of said ports; a plate removably engaging the opposite ends of said cylinders; said plate provided with passages communicating with the said opposite ends of said cylinders; tubular members removably disposed between said casting and said plate in communication with the others of said ports and said passages; means for holding said casting, plate, cylinders and tubular members in fluid sealing engagement; pistons in said cylinders for reciprocation by fluid pressure on opposite sides thereof; and operative connections between said pistons and said valve means for movement of said valves by said pistons for alternately admitting fluid to opposite sides of said pistons and discharging fluid through said outlet connection.

6. The construction defined in claim 5 in which said valve means include a unitary valve seat.

7. A meter for a gasoline dispensing system comprising a ported casting provided with inlet and outlet connections with some of said ports in communication with said outlet connection; a cover disposed on said casting defining therewith a distributing chamber in communication with said inlet connection; a bottom plate removably secured to said casting in vertically spaced relation thereto; a plurality of removable attachment bolts securing said plates to said casting; a pair of cylinders removably disposed between said casting, and said bottom plate; reciprocating pistons in said cylinders; others of said ports communicating with said cylinders on one side of said pistons; there being passages in said bottom plate communicating with said cylinders on the opposite sides of said pistons; tubular members removably disposed between said casting and said bottom plate and providing communication between said passages and others of said ports; valve means in said distributing chamber for controlling said ports; a crank shaft journalled in said casting; and operative connections between said crank shaft and said pistons and valve means whereby said valve means are operated by said pistons for admitting fluid to opposite sides of said pistons and discharging fluid through said outlet connection.

8. The construction defined in claim 7 in which said casting and said bottom plate are provided with vertically alined seats in which the opposite ends of said cylinders and said tubular members are removably disposed; and fluid sealing gaskets disposed between the bottoms of said seats and the adjacent ends of said cylinders and said tubular member for providing fluid tight connections.

9. The construction defined in claim 7 together with a registering mechanism removably supported by said casting; and means operatively connecting said registering mechanism with said crank shaft for operation thereby.

In testimony whereof I affix my signature.
HARRY G. WEYMOUTH.